United States Patent [19]

Lerke et al.

[11] Patent Number: 5,092,932

[45] Date of Patent: Mar. 3, 1992

[54] METHOD OF PRODUCING ACTIVE MINERAL ADDITIVE FOR BINDING MATERIALS

[76] Inventors: Pavel P. Lerke, ulitsa Lugovaya, 4; Stanislav V. Terekhovich, ulitsa Dostoevskogo, 17; Boris V. Sindeev, ulitsa Shopena, 5, all of Chimkent; Boris A. Kurnikov, ulitsa Mira, 19, Chimkentskava oblast, poselok Sas-Tjube; Ilya M. Poddubny, kvartal 19, 17, kv. 25, Tashkent massive Chilanzar; Ivan I. Dongauzer, 18 mikroraion, 16, kv. 7, Chimkent; Valery V. Shnaider, 17 mikroraion, 20, kv. 58, Chimkent; Satbek Kozhamuratov, ulitsa Gaidara, 143, Chimkent, all of U.S.S.R.; Alexandr P. Lerke, ulitsa Lugovaya, 4, Chimkent, all of U.S.S.R.

[21] Appl. No.: 460,129

[22] PCT Filed: Sep. 23, 1988

[86] PCT No.: PCT/SU88/00183

§ 371 Date: May 17, 1990

§ 102(e) Date: May 17, 1990

[87] PCT Pub. No.: WO90/03345

PCT Pub. Date: Apr. 5, 1990

[51] Int. Cl.$^5$ ............................ C04B 7/36; C04B 7/02
[52] U.S. Cl. .................................... 106/767; 106/624; 106/714; 106/741; 106/789; 501/155
[58] Field of Search ............... 106/624, 714, 741, 789, 106/767; 501/155

[56] References Cited

U.S. PATENT DOCUMENTS 3,085,022  4/1963  Koch ................................. 106/741

FOREIGN PATENT DOCUMENTS

| 5020273 | 2/1980 | Japan . | |
| 7073108 | 5/1982 | Japan . | |
| 1101441 | 5/1986 | Japan . | |
| 2132744 | 6/1987 | Japan . | |
| 0057014 | 3/1969 | Poland | 501/155 |
| 0537045 | 12/1976 | U.S.S.R. | 501/155 |
| 1400854 | 7/1975 | United Kingdom | 501/155 |

OTHER PUBLICATIONS

CA97(14): 113709J, "Granulation of Slag from Steelmaking", Hamada Heavy Industries Co., Ltd., JP 57073108 AZ May 7, 1982.
CA93(8): 78411Z, "H$_2$O granulation of Blast-Furnace Slag", Kadona et al., JP 55020273 Feb. 13, 1980.
CA105(14) 119753Z, "Aging Treatment of Steelmaking Slag", Tsujimatsu et al., JP 61101441 AZ May 20, 1986.
CA107(16) 139889t, "Ferronickel Slag for Concrete Aggregates", Ono et al., JP 62132744 A2 Jun. 16, 1987.

Primary Examiner—Mark L. Bell
Assistant Examiner—Michael Marcheschi
Attorney, Agent, or Firm—Ladas & Parry

[57] ABSTRACT

Initial granulated blast furnace or phosphatic slag is subjected to heat treatment at a temperature of 1000°–1200° C. in oxidizing gas atmosphere to produce an active mineral additive for binding materials.

9 Claims, No Drawings

METHOD OF PRODUCING ACTIVE MINERAL ADDITIVE FOR BINDING MATERIALS

FIELD OF THE INVENTION

The present invention relates to the production of binding materials, more particularly, to a method of producing active mineral additives for binding materials.

BACKGROUND ART

Known in the art is the production of cements by using, apart from Portland cement clinker and gypsum, additionally mineral additives, the weight fraction of which accounts for 5 to 60% by mass. Introduction of active mineral additives into cement makes it possible to reduce the cost of the latter and in some cases to modify the construction and engineering properties of cement (for instance, cement hardening kinetics, heat release, setting periods, resistance to sulphates).

The production of cement may involve the use of both artificial and natural mineral additives in an active mineral component. The natural mineral additives may include: diatomite, tripolite, opoka, "gliesh". The artificial mineral additives include blast furnace and phosphatic slags.

When blast furnace and phosphatic slags are used as mineral additives to cements, the slags are subjected to granulation by dispersing the melt of these slags and their sharp cooling. However, the hydraulic activity and whiteness index of the slags in this case are low.

The hydraulic activity of granulated blast furnace slags can be increased by their heat treatment at a temperature of 700° C. for 1-5 minutes (I. N. Rogacheva "Research and development in the field of technology of water-resistant magnesia cement", Kharkovsky Politekhnichesky Institut, 1975, pp. 12-14). This is accompanied by a partial crystallization of slag glass and an increase in the defectiveness of the structure and, as a result, the activity of slags rises, thereby providing a subsequent increase in the strength of cement by 2-3 MPa. The whiteness of the additive produced amounts to 60%.

DISCLOSURE OF THE INVENTION

The present invention is based on the problem of providing a method for producing an active mineral additive with higher hydraulic activity and whiteness by modifying the structure and mineralogical composition of slag.

A BEST MODE OF CARRYING OUT THE INVENTION

This object is attained by the method of producing an active mineral additive to binding materials by heat treatment of granulated blast furnace or phosphatic slag. According to the present invention, the heat treatment in oxidizing gas atmosphere is carried out at the temperature of 1000°-1200° C.

The present invention makes it possible to produce additives with whiteness of 80-96% (on the basis of phosphatic slag) or 70-80% (on the basis of blast furnace slag). The hydraulic activity of the mineral additive determined by the strength of cement containing from 10 to 60% by mass slag is increased by 3-7 MPa.

According to the present invention, to reduce the temperature of heat treatment to 1000°-1100° C. and increase the hydraulic activity of the additive (determined by cement strength) by 5-7 MPa, it is expedient to use oxidizing steam gas atmosphere, in which the mass ratio between oxygen and steam is from 10:1 to 1:10.

According to the present invention, for a further increase in the hydraulic activity of additive (determined by the strength of cement) by 7-10 MPa it is preferable that the heat treatment of slag should be carried out by its instantaneous heating followed by its sharp cooling.

Further objects and advantages of the present invention will be more fully understood from the following detailed description of the method of producing an active mineral additive and examples of carrying out this method.

The stock material for producing an active mineral additive, according to the present invention, appears to be granulated blast furnace and phosphatic slags.

In their chemical composition phosphatic slags consist of silicon oxide, 38-42% by mass, aluminum oxide, 2-4% by mass, iron oxide, 0.1-0.3% by mass, calcium oxide, 38-48% by mass, magnesium oxide, 2-5% by mass, oxides of alkali metals, 0.4% by mass, fluorine, 1.5-2.8% by mass, and phosphorus pentoxide, 0.5-2.5% by mass. Blast furnace slags consist of silicon oxide, 38-50% by mass, aluminum oxide, 5-18% by mass, iron oxide, 0.1-1.0% by mass, calcium oxide, 38-50% by mass, magnesium oxide, 2-10% by mass, oxides of alkali metals, 0.6% by mass, sulphide sulphur, 1.15 by mass.

In their mineralogical composition granulated phosphatic slags consist of slag glass of wollastonite composition, 80-85% by mass, pseudowollastonite, 10-15% by mass, mililite, 5-10% by mass. Crystalline phosphatic slags consist of wollastonite, 40-90% by mass, mililite, 10-60% by mass, rankinite, 3-10% by mass, cuspidine, 5-10% by mass, iron, manganese, calcium sulphides, 0.5-2.0% by mass, and iron and manganese phosphides, 0.5-2.0% by mass. Blast furnace granulated slags consist of slag glass 80-85% by mass, and crystalline phase of mililite or wollastonite composition, 15-20% by mass. Crystalline blast furnace slag consists of wollastonite, 20-70% by mass, mililite, 10-80% by mass, rankinite, 3-10% by mass, iron and manganese sulphide, 1-2% by mass, and iron and manganese phosphides, 0.5-1.0% by mass.

To accomplish the claimed method it is possible to use slags both of vitreous and crystalline structure. The grain size of the slag employed should not exceed 15 mm.

According to the present invention, blast furnace and phosphatic slags are subjected to heat treatment at the temperature of 1000°-1200° C., carried out in oxidizing gas atmosphere.

The indicated heat treatment is accompanied by oxidation of phosphides and sulphides of iron and manganese to their colorless or poorly colored phosphates, sulphates, phosphites, sulphites and hydrophosphites. Apart from this, this results in the transformation of okermanite into gelinite, α-wollastonite into β-wollastonite, the latter of which is noted for a higher hydraulic activity and a lower susceptibility to coloring and isomorphic capacity.

Apart from the aforesaid, the heat treatment of slags in oxidizing steam gas atmosphere is accompanied by the formation of belite-like phases and depolymerization of the structure from kremasoxygen tetrahedrons.

A decrease in the temperature of heat treatment below 1000° C. causes the whiteness and hydraulic activity of slag to diminish since this leads neither to the complete oxidation of iron and manganese phosphides up to their colorless or slightly colored compounds, nor to the formation of less isomorphous, coloring and more hydraulically active slag minerals.

At a temperature above 1200° C. no further increase in the whiteness of slag is observed and its melting occurs. At the same time heat consumption rises.

It is expedient to expose slag to the indicated isothermal conditions for at least 20 minutes and 60 minutes at most. Prolongation of isothermal exposure of slag for more than 60 minutes leads only to an increase in heat consumption and does not influence the whiteness of the slag in any way.

According to the present invention, heat treatment is carried out in oxidizing atmosphere, in which the optimal content of oxygen accounts for 5-61% by mass. When oxygen content is below 5% by mass the duration of heat treatment increases, thereby leading to a greater fuel consumption and a lower yield of ready product. When oxygen content is more than 61% by mass the possibility of forming the phosphates of trivalent iron rises, thereby leading to a lower whiteness of the Portland cement.

According to the present invention, slag is preferably heat treated in oxidizing steam gas atmosphere, in which the mass ratio between oxygen and water steam is from 10:1 to 1:10. Compliance with the specified conditions makes it possible to produce an active mineral additive with high whiteness without increasing the temperature of heat treatment and prolonging the period of the heat treatment process.

Isothermal exposure of slag in steam gas atmosphere for less than 10 minutes was found to cause a drastic reduction of its whiteness and for more than 30 minutes no further increase in the whiteness of the slag was observed.

The heat treatment of blast furnace or phosphatic slag for producing an active mineral additive can be accomplished by its introduction into the zone, where the slag is gradually heated to a predetermined temperature. However it seems more efficient to carry out the heat treatment of slag under conditions of a heat shock, for instance by feeding it into the cooling zone of the unit used for producing Portland cement clinker directly on the stock mixture (used for producing clinker), subjected to roasting at 1000°-1450° C.

Blast furnace or phosphatic slag subjected to heating may be cooled by a flow of cold air or in water.

The heat shock carried out in steam gas atmosphere leads to a highly defective structure of slag and, as a result, to more hydraulically active belite-like phases.

For a better understanding of the present invention the following examples of its specific realization are given hereinbelow by way of illustration.

EXAMPLE 1.

Granulated phosphatic slag with initial whiteness of 69% in the form of grains 15 mm in size at most is subjected to heat treatment in oxidizing atmosphere containing oxygen, 10% by mass at the temperature of 1100° C. for 20 minutes. Thereafter the heat treated slag is sharply cooled in water.

The whiteness of the heat treated phosphatic slag amounts to 80%.

Heat treated phosphatic slags as an active mineral additive taken in the amount of 5-60% by mass are used in the production of Portland cement.

The Portland cement produced in the form of a solution of plastic consistency in the mass ratio of cement to sand equal to 1:3 and water-cement ratio of 0.4 is used for forming specimens 4×4×16 cm in size. The strength of the cement after 28 days of hardening (containing heat treated slag 10-20% by mass) surpasses that of the cement produced without active mineral additive by 10-30 MPa. With increase in the content of active mineral additive in cement up to 60% by mass the strength drops by 10-15 MPa and equals 30-50 MPa.

EXAMPLE 2

Active mineral additive is produced under conditions similar to those described in Example 1, however its sharp cooling is carried out in a flow of air. The whiteness of the heat treated phosphatic slag after cooling equals 78%.

The strength of cement obtained in the presence of such mineral additive corresponds to the values indicated in Example 1.

EXAMPLE 3

Active mineral additive is produced from blast furnace slag with whiteness of 60% under conditions similar to those described in Example 1.

The whiteness of the heat treated slag after cooling in water amounts to 70%.

The strength of the cement produced in the presence of such active mineral additive corresponds to the values indicated in Example 1.

EXAMPLE 4

Active mineral additive is produced from blast furnace slag with whiteness of 60% under conditions similar to those described in Example 1, however sharp cooling was carried out in a flow of air. The whiteness of the heat treated slag after cooling is 68%.

The strength of the cement produced in the presence of such active mineral additive corresponds to the values indicated in Example 1.

EXAMPLE 5

Granulated phosphatic slag with initial whiteness of 69% in the form of grains 15 mm in size at most is subjected to heat treatment in oxidizing atmosphere containing 21% by mass of oxygen at 1150° C. for 20 minutes. Thereafter the slag is sharply cooled in water.

The whiteness of the heat treated phosphatic slag amounts to 84%.

The strength of the cement produced in the presence of the obtained active mineral additive corresponds to the values indicated in Example 1.

EXAMPLE 6

Active mineral additive is produced from blast furnace slag with whiteness of 60% under conditions similar to those described in Example 5.

The whiteness of the heat treated blast furnace slag after cooling amounts to 72%.

The strength of the cement produced in the presence of the obtained active mineral additive corresponds to values indicated in Example 1.

EXAMPLE 7

Active mineral additive is produced under conditions similar to those described in Example 5, however its sharp cooling is carried out in a flow of air. The whiteness of the heat treated phosphatic slag after cooling amounts to 82%.

The strength of the cement produced in the presence of such mineral additive corresponds to the values indicated in Example 1.

EXAMPLE 8

Active mineral additive from blast furnace slag with whiteness of 60% is produced under conditions similar to those described in Example 5, however its sharp cooling is carried out in a flow of air. The whiteness of the heat treated blast furnace slag after cooling amounts to 71%.

The strength of the cement produced in the presence of such mineral additive corresponds to the values indicated in Example 1.

EXAMPLE 9

Granulated phosphatic slag with its initial whiteness of 69% in the form of grains not less than 15 mm in size is subjected to instantaneous heating, by feeding it into oxidizing atmosphere containing oxygen, 60% by mass, having a temperature of 1200° C. Thereafter the heat treated slag is sharply cooled in water.

The whiteness of the heat treated slag amounts to 97%.

The strength of the cement produced in the presence of such mineral additive corresponds to the values indicated in Example 1.

EXAMPLE 10

Active mineral additive is produced from blast furnace slag with its whiteness of 60% under conditions similar to those described in Example 9.

The whiteness of the heat treated blast furnace slag after cooling in water is 80%. The strength of the cement produced in the presence of this mineral additive corresponds to the values indicated in Example 1.

EXAMPLE 11

Active mineral additive is produced under conditions similar to those described in Example 9, however its cooling is carried out in a flow of air. The whiteness of the heat treated phosphatic slag after cooling amounts to 95%.

The strength of the cement produced in the presence of such mineral additive corresponds to the values indicated in Example 1.

EXAMPLE 12

Active mineral additive is produced from blast furnace slag with its whiteness of 60% under conditions similar to those described in Example 9, however its cooling is carried out in a flow of air. The whiteness of the heat treated blast furnace slag after cooling amounts to 78%.

The strength of the cement produced in the presence of such mineral additive corresponds to the values indicated in Example 1.

EXAMPLE 13

Granulated phosphatic slag with its whiteness of 69% in the form of grains 15 mm in size at most is subjected to heat treatment in steam gas atmosphere, in which the weight ratio of oxygen to steam equals 1:10, at a temperature of 1000° C. for 10 minutes. Thereafter the heat treated slag is sharply cooled in water.

The whiteness of the cement produced in the presence of such active mineral additive corresponds to the values indicated in Example 1.

EXAMPLE 14

Active mineral additive is produced under conditions similar to those described in Example 13, however its heat treatment is carried out for 30 minutes in steam gas atmosphere, in which the weight ratio of oxygen to water steam is 1:1, and its sharp cooling is accomplished in a flow of air.

The whiteness of the heat treated phosphatic slag after cooling is 82%.

The strength of the cement produced in the presence of such active mineral additive corresponds to the values indicated in Example 1.

EXAMPLE 15

Active mineral additive is produced from blast furnace slag with whiteness of 60% under conditions similar to those described in Example 13, however its heat treatment is carried out for 30 minutes in steam gas atmosphere, in which the weight ratio of oxygen to steam equals 10:1.

The whiteness of the heat treated blast furnace slag after cooling in water is 78%.

The strength of the cement produced in the presence of such mineral additive corresponds to the values indicated in Example 1.

EXAMPLE 16

Active mineral additive is produced from blast furnace slag with whiteness of 60% under conditions similar to those described in Example 13, however its heat treatment is carried out for 10 minutes in steam gas atmosphere, in which the weight ratio of oxygen to steam is 1:5 and sharp cooling is accomplished in a flow of air.

The whiteness of the heat treated blast furnace slag after cooling equals 71%.

The strength of the cement produced in the presence of such active mineral additive corresponds to the values indicated in Example 1.

INDUSTRIAL APPLICABILITY

The present invention will find application in the production of cement, in particular: white and coloured Portland cement employed for the finishing of buildings and various structures, Portland cement with mineral additives, Portland blast furnace cement and slag binding materials with modified properties.

Apart from this, the present invention will find application in the production of ceramic items and glass-crystalline materials with special properties.

We claim:

1. A method for increasing the whiteness and hydraulic activity of granulated blast furnace or phosphatic slag for use of said slag as an active mineral additive for a binding material, said process comprising heat treating said granulated blast furnace or phosphatic slag in an oxidizing gaseous medium at a temperature of 1000°–1200° C.

2. A method according to claim 1 wherein the heat treatment is carried out in oxidizing steam gas atmosphere, in which the weight ratio of oxygen to steam is from 10 to 1:10.

3. A method according to claim 1, wherein the heat treatment of said slag is carried out by introducing said slag into a zone which has already been heated to a temperature sufficient to effect said heat treatment, said method further comprising cooling said slag by immersing the slag in a flow of cold air or in water subsequent to said heat treatment.

4. An additive for a binding material prepared by the method of claim 1.

5. An additive for a binding material prepared by the method of claim 2.

6. An additive for a binding material prepared by the method of claim 3.

7. In a method for forming cement containing 5 to 60% by mass of granulated blast furnace or phosphatic slag, wherein the slag used in forming the cement has been heated to increase the hydraulic activity of the cement formed with said slag, the improvement comprising including in said cement granulated blast furnace or phosphatic slag which has been heat treated in an oxidizing gaseous medium at a temperature of 1000°–1200° C.

8. A method for forming cement as claimed in claim 7, wherein the heat treatment of said slag has been carried out in oxidizing steam gas atmosphere, in which the weight ratio of oxygen to steam is from 10 to 1:10.

9. A method for forming cement as claimed in claim 8, wherein the heat treatment of said slag has been carried out by introducing said slag into a heating zone which has already been heated to a temperature sufficient to effect said heat treatment, said method further comprising cooling said slag by immersing the slag in a flow of cold air or in water subsequent to said heat treatment.

* * * * *